United States Patent

Joel, Jr.

[15] 3,673,335

[45] June 27, 1972

[54] SWITCHING OF TIME DIVISION MULTIPLEX LINES AND ANALOG TRUNKS THROUGH TELEPHONE CENTRAL OFFICES

[72] Inventor: Amos Edward Joel, Jr., South Orange, N.J.

[73] Assignee: Bell Telephone Laboratories, Incorporated, Murray Hill, N.J.

[22] Filed: Aug. 24, 1970

[21] Appl. No.: 66,192

[52] U.S. Cl...................179/15 AQ, 179/15 AT, 179/15 BD, 179/18 J

[51] Int. Cl...........................................................H04j 3/00

[58] Field of Search..............179/15 AQ, 18 ES, 18 FC, 18 J, 179/2 DP, 15 AP, 15 AT, 15 BD, 15 BY, 15 AC

[56] References Cited

UNITED STATES PATENTS

| | | | |
|---|---|---|---|
| 3,585,306 | 6/1971 | Battocletti | 179/15 AQ |
| 3,403,383 | 9/1968 | Kienzle | 179/18 ES |
| 3,458,659 | 7/1969 | Sternung | 179/15 AQ |

FOREIGN PATENTS OR APPLICATIONS

| | | | |
|---|---|---|---|
| 1,122,924 | 8/1968 | Great Britain | 179/2 DP |

*Primary Examiner*—Kathleen H. Claffy
*Assistant Examiner*—David L. Stewart
*Attorney*—R. J. Guenther and James Warren Falk

[57] ABSTRACT

A telephone switching office is disclosed wherein connections may be established between conventional analog trunks and time division multiplex lines. A plurality of digital trunks are employed equal in number to the number of incoming and outgoing time slot channels to be switched through the office. Digital trunks associated with incoming channels are provided with shift registers for storing the bit patterns carrying the information for a respective time slot. This information is outpulsed from the shift registers under control of readout pulses derived from a trunk time slot switch which is set by common control to deliver readout pulses in a time sequence that is appropriate to the selected time slot in the outgoing TDM line to which a cross-office connection is desired. In addition, conversion junctor circuits are provided having encoders and decoders which are selectively gated to deliver the digital information to the appropriate time slot of the TDM line involved in the connection by signals derived from a junctor time slot switch whose operation is dictated by common control Advantageously, both the trunk time slot link switch and the junctor time slot link switches are of the crossbar type.

8 Claims, 3 Drawing Figures

INVENTOR
A. E. JOEL, JR.
BY [signature]
ATTORNEY

Patented June 27, 1972 3,673,335

3 Sheets-Sheet 3

SWITCHING OF TIME DIVISION MULTIPLEX LINES AND ANALOG TRUNKS THROUGH TELEPHONE CENTRAL OFFICES

BACKGROUND OF THE INVENTION

This invention relates to time division multiplex transmission and more particularly to the switching of time division multiplex channels through conventional telephone switching offices.

In recent years pulse code modulation, PCM, has been increasingly employed in many telephone communications systems. Pulse code modulation, in which the amplitude of a speech sample is encoded into a binary pulse sequence, is ideally suited for multiplex transmission and in one present day system, the T1 carrier system manufactured by the Western Electric Company, is employed to encode the contents of 24 communications channels which are transmitted in time slots at the rate of 1.544 megabits per second.

While time division multiplex systems continue to grow in usage, this growth is presently limited by the inability of existing telephone switching centers to handle digital signals. Present day space division switching offices, which will sometimes be referred to hereinafter as analog facilities, are accustomed to receiving call signaling information over an incoming trunk and establishing a cross-office connection to an outgoing trunk. In so doing apparatus known as a register-sender is attached to the incoming trunk when it displays the calling condition. The register-sender receives the call signaling information, transfers it to a marker which establishes a cross-office connection and then recontrols the register-sender to outpulse the called number digits over the selected outgoing trunk. While this procedure works well for analog trunks, it is presently inapplicable to switching connections required by incoming time division multiplex lines. For example, since an incoming time division multiplex line carries 24 different channels, the information contents in each channel will be independent of that of any of the others. Channel 1 at any given time may be initiating a request for a cross-office connection; channel 2 may already be engaged in conversation; channel 3 may be disconnecting; channel 4 may be in the midst of transmitting call signaling information, etc. Further, one of the channels may require a connection to a route not served by an outgoing time division line and, therefore, some means must be provided for taking the multiplex information for this channel and converting it to analog form without necessarily doing the same for any of the other channels carried by the incoming TDM line. Conversely, an incoming analog line should be able to obtain access to an outgoing time division multiplex line.

In prior systems for switching time division multiplex lines, considerable attention has been paid to the problem of blocking, i.e., the condition which occurs when there is no time slot channel in an outgoing TDM line corresponding to the time slot channel in the incoming TDM line. In electronic systems which are designed for switching between TDM lines, some sort of storage is provided for holding incoming channel information until an appropriate outgoing time channel is available. In systems which are initially designed for this function, the availability of a centralized core memory provides for the convenient allocation of a memory for storing the eight-bit sample for each channel being switched. However, switching systems of this type do not form the bulk of the existing telephone switching network and, therefore, the growth of TDM switching has heretofore been dependent upon the construction and installation of entirely new switching centers.

SUMMARY OF THE INVENTION

In accordance with my invention, I modify a conventional tandem or toll switching office by associating a plurality of incoming and outgoing digital trunks with each of the incoming and outgoing time division multiplex lines between which switching connections are to be established. I provide as many such digital trunks as the sum of the number of incoming and outgoing multiplexed channels carried by such lines. Each digital trunk associated with an incoming time division multiplex line contains a pair of shift registers for receiving the pulse code modulation and other digital signals pertaining to a respective time slot channel. These other digital signals which comprise the call signaling and supervisory information related to an individual call are transferred from one of the shift registers in appropriate form to operate the conventionally provided register-sender of the switching office. A cross-office connection is then established by the marker or other common control of the switching office to an outgoing trunk. When a cross-office connection to an outgoing time division multiplex line is desired, the marker will select an idle one of the outgoing digital trunks assigned with the time division multiplex line for the destination indicated by the call signaling information. Advantageously, the connection between an incoming and outgoing one of the aforementioned digital trunks may be affected via a conventional wire junctor. When, however, a connection is required from an incoming analog trunk to an outgoing digital trunk serving an outgoing time division multiplex line, the marker selects one of a plurality of analog-to-PCM junctor circuits so that an appropriate encoder may be accessed and appropriate decoding be provided. Conversely, when a connection from an incoming digital trunk to an outgoing analog trunk is required, the marker selects one of a plurality of PCM-to-analog junction circuits for providing and accessing the appropriate decoding and encoding equipment.

Further, in accordance with my invention, I associate a time slot link switch with each of the incoming digital trunks to provide appropriate sequence of readout pulses to transmit cross office the contents of the aforementioned shift registers. The correct sequence of readout pulses is determined by the outgoing digital trunk to which the cross-office connection has been established and a horizontal select magnet in the time slot link switch is operated to connect pulses having the same time sequence of occurrence to the shift register in the incoming digital trunk as corresponds to the time sequence of the time slot in the outgoing time division multiplex line served by the selected outgoing digital trunk.

On the other hand, when the connection is from the incoming digital trunk to an outgoing analog trunk, the contents of the aforementioned shift register in the incoming digital trunk need not be read out in any particular time slot since they need merely be transmitted through a decoder in the PCM-to-analog junctor and whereupon they are converted to analog signals suitable for transmission over the outgoing analog trunk. Under these circumstances, the time slot switch is set by the marker so that the analog signals being transmitted in the reverse direction are encoded and placed in the time slot associated with the incoming trunk.

Conversely, when the connection is from an incoming analog trunk to an outgoing digital trunk serving a TDM line, the encoder in the analog-to-PCM junctor will have to be supplied with gating signals so that speech samples are encoded in time to be transmitted during the time slot served by the outgoing digital trunk. These gating signals are provided to the junctor through a junctor time slot switch wherein a sequence of pulses is selected corresponding to the time sequence of the selected outgoing digital trunk. Advantageously, the encoder circuitry required by the analog-to-PCM and PCM-to-analog junctors may be shared subdividing the time slots into phases. An additional link switch then is operated to define the phase of the time slot during which the gating pulse may be delivered to associate a common encoder with a particular conversion junctor.

DESCRIPTION OF THE DRAWING

The foregoing and other objects and features of my invention may become more apparent from the following detailed description and drawing in which.

GENERAL DESCRIPTION

Figure 1:
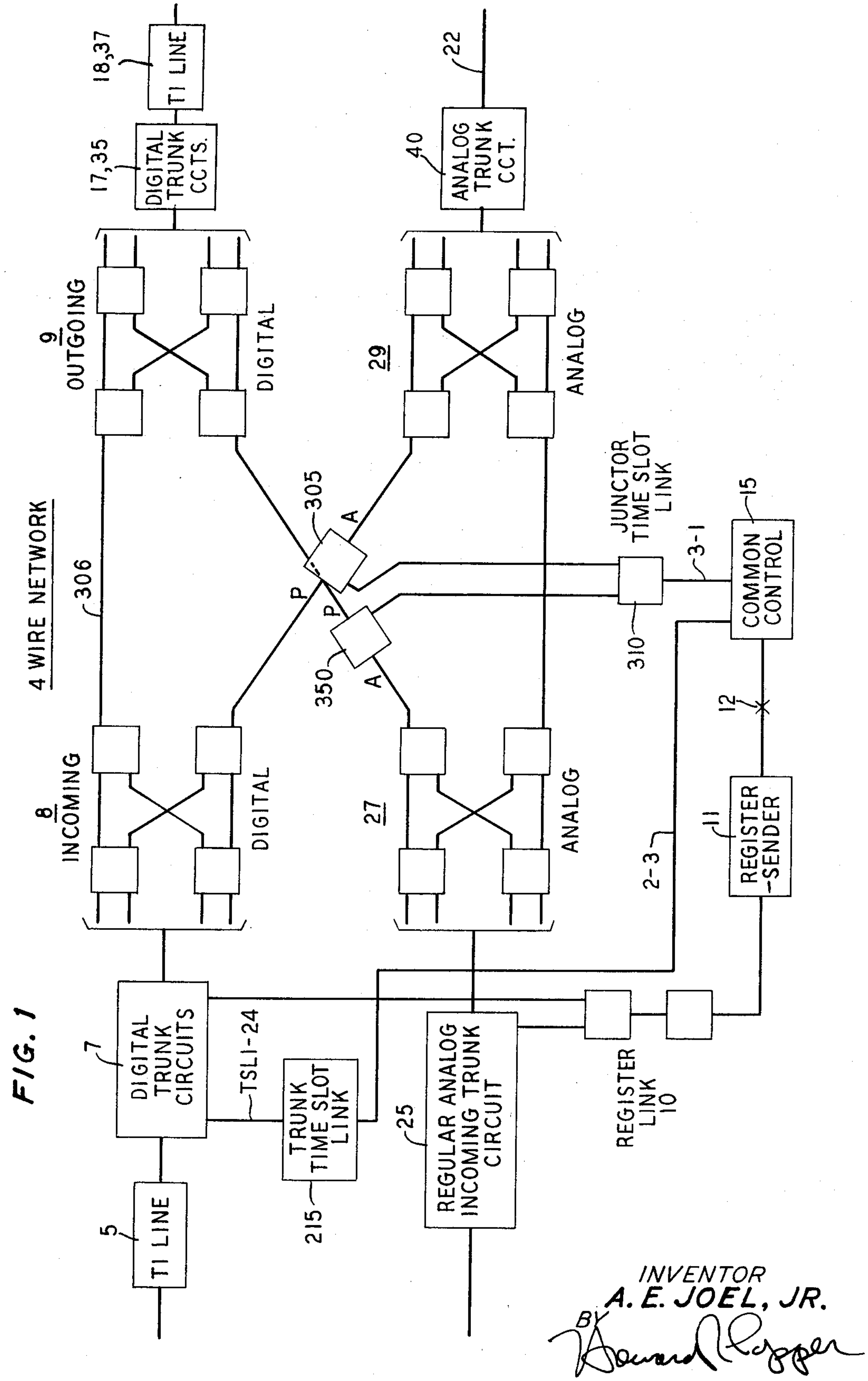
FIG. 1 shows a switching network of a conventional tandem or toll switching office adapted in accordance with my invention for establishing switching connections among both time division multiplex lines and analog trunks through the use of conversion junctor circuits and digital trunk circuits.

Referring now to FIG. 1, a time division multiplex line 5 incoming from a remote office (not shown) carries a plurality of time slot communication channels in which the amplitude of speech samples may be encoded in any suitable binary code. In addition, one or more bits of each communications channel time slot may be assigned for supervisory or call signaling information, as is well known. I provide each such time division multiplex line with a plurality of digital trunk circuits 7–1 through 7–24, there being one such digital trunk circuit for every time slot communications channel in the frame of time slot signals carried by line 5.

Each such digital trunk circuit associated with an incoming one of the time division multiplex lines includes a primary and a secondary shift register shown in detail in FIG. 2, for buffering and then forwarding call signaling information over link 10 to register-sender 11 of the switching office and for subsequently receiving the call signaling information outpulsed by register-sender 11 after an appropriate cross-office connection to an outgoing trunk has been established by common control 15.

In accordance with my invention, when the destination is served by an outgoing time division multiplex line such as line 37, the cross-office connection will involve the use of a wire junctor 306 to an outgoing one of the digital trunks 35 serving the outgoing TDM line. When the cross-office connection is to be made to a conventional analog trunk 40 serving the destination, the cross-office connection employs a PCM-to-analog junctor 305.

When an incoming call arrives over a conventional incoming trunk 25, operations will proceed in the conventional manner of prior dual or tandem switching systems such as R. N. Breed et al. U.S. Pat. No. 2,848,543 or J. W. Gooderham et al. U.S. Pat. No. 2,868,884 until the common control marker 15 determines that a cross-office connection is required to be made from trunk 25 to a time division multiplex line such as line 18 serving the indicated destination. The marker will then select an idle one of digital trunks 17 associated with the TDM line and it will connect an analog-to-PCM junctor circuit 350 between trunks 25 and 17.

When the connection involves one of incoming digital trunks 7–1 through 7–24, the marker will operate trunk time slot switch 215 over cable 2–3 to supply the digital trunk with a sequence of readout pulses that is in time correspondence with the time slot of the outgoing digital trunk to which a cross-office connection has been made. When the connection involves the use of a PCM-to-analog junctor 305 or an analog-to-PCM junctor 350, the marker will control junctor time slot switch 310 over cable 3–1 to provide gating pulses for the respective encoders and decoders so that digital signals are delivered in the appropriate phase for the channel of the one TDM line involved in the connection.

DETAILED DESCRIPTION

Switching — TDM Incoming to TDM Outgoing

Figure 2:
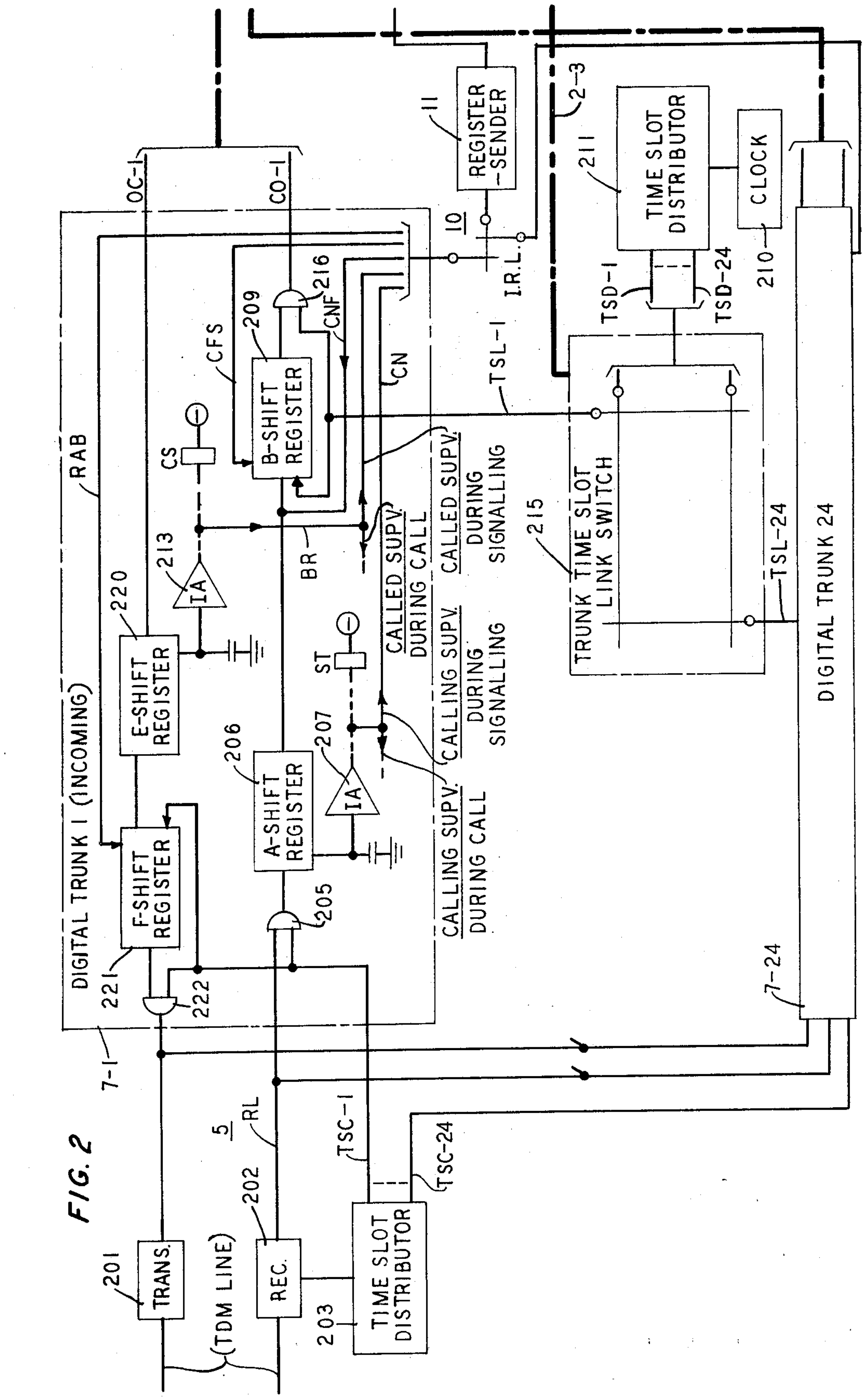
FIG. 2 shows the digital trunks and the trunk time slot switch associated with such trunks at the incoming side of the switching office.

Referring now to FIG. 2, time division multiplex line 5 is shown together with the transmitter 201 and receiver 202 of its terminal equipment. Associated with receiver 202 is time slot distributor 203 which applies a signal successively to each of leads TSC–1 through TSC–24 during the continuance of a respective one of the 24 time slots carrying the pulse coded communications channels of line 5's transmission frames.

The output of receiver 202 is multipled to 24 digital PCM trunks 7–1 through 7–24, there being one such digital trunk for every time slot in a frame. When time slot distributor 203 energizes lead TSC–1, the binary code pattern contained in the first time slot, and appearing on lead RL at the output of receiver 202, is entered through AND gate 205 into A-shift register 206. During the second and subsequent time slots, distributor 203 successively energizes the remaining one of leads TSC–1 through TSC–24 thereby entering the contents of the next 23 time slots into the A shift registers of the remaining ones of trunks 7–1 through 7–24.

As is known, the type of information carried by a time slot may vary depending upon the particular variety of the time division multiplex system involved. In one such system in which the time slot contains eight bits, seven bits may be devoted to a code representing the amplitude of a speech sample while the eighth bit may be used for supervisory information or call signaling information. In other systems more than one bit in a time slot may be used for supervisory or call signaling information. However, for present purposes, it will be assumed that only one such bit, the eighth bit, will be employed for these purposes.

Before call signaling information is transmitted in a channel of a TDM line, the channel will transmit a signal to indicate the calling condition. Assuming that the first time slot contains a signal indicating the calling condition in its eighth bit, the appearance of this bit pattern in A-shift register 206 will be detected by integrating amplifier 207 which in turn will operate relay ST over the dotted path. In the illustrative system, it will be assumed that when the calling office at the remote end of TDM line 5 signals an off-hook condition for the channel corresponding to the first multiplex time slot, it will send a "1" bit at the eighth bit position of this time slot. This "1" bit will continue to be sent by the calling office in the first time slot of every frame until the calling office is informed that a register has been attached. Integrating amplifier 207 responds to the appearance of this "1" bit during every frame to operate relay ST. Relay ST operated, at one of its make contacts, not shown, operates incoming register link 10 to associate an idle register-sender 11 with trunk 7–1. The manner in which a start relay such as relay ST in an incoming trunk operates an incoming register link, being well known, will not be described herein.

As is also well known, a conventional register-sender normally returns to the conventional incoming trunk a signal that can be repeated by supervisory relays in the trunk to the calling office to indicate that the register has been attached. Since, however, there is no direct wire path between trunk 7–1 and the remote calling office at the distant end of time division multiplex line 5, register-sender 11 applies the register-attached signal to lead RAB. The signal on lead RAB enters a bit value indicating "register-attached" into the last stage of eight-bit F-shift register 221. For example, assume that in the illustrative system, a register-attached signal would normally be given by the register reversing the polarity of the tip and ring conductors to the calling office. To adapt this type of signaling to the arrangement of my invention merely requires that the register contain an additional relay which is operated only when the polarity reversal occurs and that contacts of this relay (not shown) apply a signal of appropriate duration and magnitude to lead RAB to place a "1" bit in the rightmost or last stage of F-shift register 221. Thereafter the contents of F-shift register 221 is read out under control of the enabling signal on lead TSC–1 and is forwarded through gate 222 to transmitter 201 for transmission to the remote calling office at the distant end of line 5. The calling office recognizes the arrival of the register-attached signal and commences sending call signaling information to receiver 202.

When the call signaling information subsequently appears on lead RL at the output of receiver 202, it is entered into A-shift register 206 and detected by integrating amplifier 207 in manner similar to that previously described with respect to the calling supervisory state. That is, each time a bit value indicating line-open or on-hook occurs during dial pulsing, integrating amplifier 207 responds to this bit value during the time slot to apply a signal to lead CN that persists at least until the next time slot. Relay ST does not respond to the output of amplifier 207 after register-sender 11 is attached, its operating path, shown dotted, having been opened by break contacts of other conventional trunk relays, not shown. However, since link 10 connects lead CN from trunk 7–1 to register-sender 11, the called number registration relays, not shown, within the register-sender will operate in response to the call signaling information detected by integrating amplifier 207 until all the call signaling information transmitted by the remote calling office has been entered into the register-sender. Register sender 11 thereupon, in the usual manner, operates register maker connector 12 to furnish the called number information to common control marker 15. The marker translates the called number information received from register-sender 11 and selects proper trunk outgoing to the destination indicated by that information.

Assuming that the destination indicated by the translation of the called number is served over an outgoing time division multiplex line such as line 37, the marker will seize the outgoing trunk link frame 9 in which an idle one of outgoing digital trunks 35 serving line 37 has an appearance. I provide as many such outgoing trunks 35 as there are time slot channels in outgoing TDM line 37. Assuming that marker 15 determines that trunk 35–1 is idle, trunk link frame 9 and trunk 35–1 will be seized and a cross-office connection will be established from incoming digital trunk 7–1, through incoming trunk link frame 8, and wire junctor 306 to trunk 35–1. When the cross-office connection is established, common control marker 15 instructs register-sender 11 to send a signal over trunk 35–1 to inform the called office that the channel corresponding to trunk 35–1 is in the calling condition. In conventional analog switching systems, register-sender 11 would apply calling battery supervision to the tip and ring lead outgoing to the called office. Since there is no such direct wire path provided by a channel in an outgoing TDM line, a line supervisory relay, not shown, may be added to register-sender 11 to respond to the register-sender's normal calling battery supervision and a contact of this relay may be wired to energize lead CFS when the calling battery supervision appears. The energization of lead CFS inserts a "1" bit in the left-most or eighth bit position of B-shift register 209. This bit in the eighth bit position when received by the called office causes a sequence of operations in that office similar to that just described for operating the ST relay in the switching office depicted in FIG. 2.

The contents of B-shift register 209, including the supervisory bit indicating the calling condition, must now be shifted out and transmitted cross-office in the appropriate time relationship so that the information contents will be transmitted in the correct time slot of outgoing time division multiplex line 37. In accordance with my invention, I provide a trunk time slot link switch 215 which advantageously may comprise a plurality of conventional crossbar switches. The plurality of crossbar switches is arranged to provide as many horizontal levels as there are outgoing digital trunks 35 and 17 in the associated TDM lines 37 or 18 in FIG. 3. Each horizontal level in switch 215 is wired to correspond to a respective one of digital trunks 35 and 17 and, accordingly, to a respective time slot in outgoing TDM lines 37 and 17. Each time one of these trunks is selected by marker 15, the identity of the trunk is used by the marker 15 so that a corresponding level in trunk time slot link switch 215 will be operated by it over cable 2–3.

Each horizontal level of switch 215 is wired to a respective one of leads TSD–1 through TSD–24 at the output of time slot distributor 211. Distributor 211 operates to distribute eight-bit sequences of 1.544 megabit clock pulses provided by office clock 210 among the horizontal levels of switch 215.

The cross connections internal to the marker 15 insure that when an idle outgoing trunk is selected, the level of time slot switch 215 connected to the incoming trunk 7–1 through lead TSL–1 is the same as the assignment of leads OTS–1 through OTS–24 and OTS'–1 through OTS'–24 at the outputs of time slot distributors 303 and 304 that are made among digital trunks 35 and 17, respectively. Accordingly, when the marker 15 selects outgoing trunk 35–1 in trunk link frame 9, it will also select that level in trunk time slot link switch 215 which is provided with a sequence of eight pulses that corresponds to the digital signals that should be transmitted during the time slot of TDM line 37 served by trunk 35–1. The signals appearing on the selected level of switch 215 are applied to lead TSL–1 and cause the contents of B-shift register 209 to be shifted out through gate 216 and lead CO1 through incoming trunk link frame 8, wire junctor 306, outgoing trunk link frame 9, trunk 35–1 and transmitter 38 to outgoing TDM line 37.

When the called office at the remote end of TDM line 37 detects the calling supervisory bit, it will undertake a series of actions similar to that described in FIG. 2 of the present office. When the remote office attaches its register-sender it will send a register-attached signal in the eighth bit position of the time slot to the office in FIG. 3 and this bit will be received in receiver 36. Time slot distributor 303 will energize transmission gate 35G in trunk 35–1 and the contents of the time slot will be transmitted through trunk 35–1, outgoing trunk link frame 9, wire junctor 306, incoming trunk link frame 308 and lead OC1 in FIG. 2 to E-shift register 220. There, the bit in the eighth bit position will be detected by integrating amplifier 213 which, in turn, will energize lead BR to register-sender 11. Register-sender 11 responds to the signal on lead BR and commences outpulsing the called number information over lead CNF to the input of B-shift register 209. Since B-shift register 209 is provided with the correct sequence of readout pulses by trunk time slot link switch 215, the called number information will be transmitted in the appropriate time slot of outgoing TDM line 37 to the called office.

After register-sender 11 has completed sending all of the called number information, it disconnects from trunk 7–1 releasing incoming register link 10. If the called office is able to complete the call to a called party, it will apply ringing to the called party's telephone. The manner in which a called office applies ringing or detects the busy condition of a called line is well known and need not be repeated herein. If the called party answers, a supervisory bit indicating called party answer will be returned by the called office in the eighth bit position of the time slot. This bit will be detected by integrating amplifier 213 when it appears in E-shift register 220 and integrating amplifier 213 will operate called party supervision relay CS in trunk 7–1. The operating path from the output of integrating amplifier 213 to the winding of relay CS has been shown dotted, the customary relay contacts normally existing in the operating path to the winding of the called supervisory relay being omitted from the drawing for the purpose of simplification.

After the CS relay operates trunk 7–1 will function to carry the pulse coded modulation signals of the conversation between the calling and called parties. The PCM signals from the calling office will be entered into A-shift register 206 under control of time slot distributor 203 and gate 205 until the A-shift register is fully loaded. During the next frame, the contents of the A-shift register is entered into B-shift register 209. The contents of B-shift register 209 is then transmitted cross-office under control of readout pulses applied to lead TSL–1 which readout pulses are in synchronism with the time slot in outgoing TDM line 37 corresponding to digital trunk 35–1. Similarly, PCM signals from the called party arriving in the same time slot of line 37 and received in receiver 36 are forwarded through digital trunk 35–1 under control of time slot distributor 303 and gate 35G cross-office to E-shift register 220. During the next frame the contents of E-shift register 220 are transferred to F-shift register 221. The contents of F-shift register 221 is forwarded to the calling party in the appropriate time slot under the control of time slot distributor 203 and gate 222. Accordingly, bi-directional transmission occurs and both parties are established in communications relationship.

Accordingly, it is seen how a cross-office connection is established for an incoming channel of a time division multiplex line to an idle channel in an outgoing time division multiplex line using a digital incoming trunk 7–1, a wire junctor 306, and a digital outgoing trunk 35–1. In similar manner connections may be established from the remaining incoming TDM channels associated with TDM line 5 and also to the remaining channels associated with outgoing TDM lines 37 and 18.

Switching — TDM Line to Analog Trunk

Thus far, a connection has been described between the channel corresponding to time slot 1 of incoming TDM line 5 and an idle time slot in outgoing TDM line 37. However, it will be apparent that not every destination will be served by an outgoing TDM line and it may happen that an incoming channel on line 5 will transmit call signaling information to common control marker 15 from which marker 15 determines that a connection to an outgoing analog trunk such as trunk 40 is required to complete the call to its indicated destination.

Let it be assumed that time slot 24 of incoming TDM line 5 carries such a call. The digital signals for the 24th time slot will be applied to digital trunk 7–24 when time slot distributor 203 energizes lead TSC–24 in similar manner to the way in which digital information for the first time slot was applied to digital trunk 7–1. The digital information for the 24th time slot is registered into an A register in trunk 7–24, the register-sender 11 is attached via incoming register link 10 and the latter transmits the called number information to common control marker 15 in exactly the same manner as previously described for trunk 7–1. This time, however, it is assumed that marker 15 translates the called number information and determines that analog trunk 40 is the trunk for the indicated route. Marker 15 will seize trunk 40 and outgoing trunk link frame 29. However, incident to the establishment of a cross-office connection between the appearance of trunk 7–24 in incoming trunk link frame 8 and the appearance of trunk 40 in outgoing trunk link frame 29, marker 15 selects a PCM-to-analog junctor circuit 305. Operations in trunk 7–24 proceed in the same manner as previously described for trunk 7–1. In this case, however, since the marker did not set any linkages to an outgoing digital trunk in trunk link frame 9, it need not select any particular level in trunk time slot link switch 215 and instead may select any available sequence of pulses provided by clock 210 for application to lead TSL–1. For example, the sequence of output pulses selected may advantageously correspond to the time slot pulses for incoming trunk 7–1. The digital information shifted out of B-shift register 209 by the pulses applied to lead TSL–1 appears on lead CO–1 and enters the left-hand side of PCM-to-analog junctor 305. This digital information is decoded by decoder 308 and transmitted through trunk link frame 29 to analog trunk 40. To assure that the information is gated into decoder 35 at the same time that it is applied to lead CO–1 by gate 216, a junctor time slot link 310 is provided having a link switch 312 that is set by marker 15 over cable 3–1 in the same fashion that the marker sets trunk time slot link switch 215 in FIG. 2. Accordingly, gates G1 and G2 at the input and output, respectively, of decoder 308 receive pulses from switch 312 which is operated to select the same sequence with the pulses as are applied to lead TSL–1.

Since outgoing trunk 40 is an analog trunk, the supervisory information returned by the called office and the subsequent voice signals will have to be converted to PCM signals so that the calling office at the remote end of TDM line 5 will be able to properly receive them. Analog signals from trunk 40 enter gate G3 at the right-hand side of PCM-to-analog junctor 305 under control of the office clock time slot pulses provided through switch 312. Apparatus for encoding analog to pulse code modulation signals is well known and is not shown in detail in the drawing. However, since this apparatus is usually quite expensive, it will be advantageous to share an encoder among different channels. This may conveniently be done by dividing each time slot into four phases and connecting an encoder to a different channel on each of the four phases as described, for example, in the Nov. 1969 issue of the *Bell Laboratories Record* at page 327. Junctor time slot link 310, accordingly, contains a source of clock phase pulses which subdivides a time slot into four intervals and includes a second link switch 314 by means of which a different set of the phase pulses will be delivered to each junctor. Thus, encoder 309 will be connected to receive analog information from trunk 40 when gates G3 and G4 are enabled and will deliver that information to lead OC–1 when gates G5 and G6 are enabled, gates G4 and G5 being enabled for only a quarter portion of time during which gates G2 and G6 are enabled.

Accordingly, a connection from an incoming channel of a time division multiplex line has been established to an outgoing analog trunk, the digital information being converted to analog information by decoder 308 which is gated at the same time that shift register 209 is gated and analog information returned by trunk 40 from the called office is converted into pulse code modulations by encoder 309 which is employed by junctor 305 during one-quarter of the time slot that decoder 308 is employed.

Switching — Incoming Analog to Outgoing TDM Line

If the calling office, not shown, is a conventional analog office, marker 15 in establishing an outgoing cross-office connection for the call may determine that the destination is served by an outgoing time division multiplex line. Since conventional incoming trunks are well known and since the operation of the incoming register link 10 and register-sender 11 for such trunks is quite conventional, the handling of such a call will be described only from the point of extending a connection from the trunk's appearance in incoming trunk link frame 27.

Figure 3:
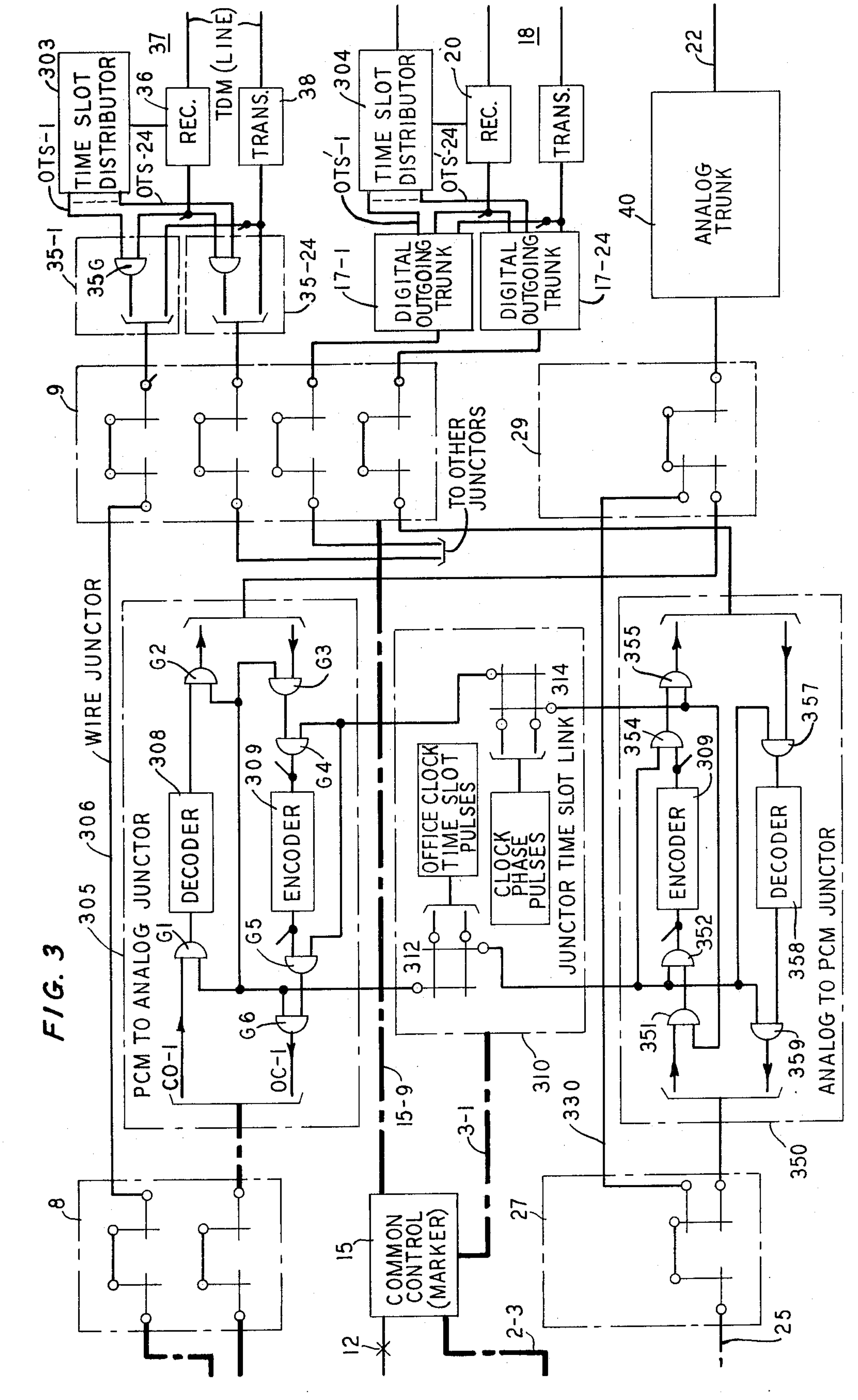
FIG. 3 shows the conversion junctor circuits and the digital and analog trunk at the outgoing side of the switching office.

Let it be assumed that trunk 25, FIG. 3, represents the output of an incoming trunk circuit from a conventional analog office. If the marker upon decoding the call signaling information determines that the destination can be served by an analog trunk, a conventional wire junctor such as junctor 330 may be employed and a connection established from incoming trunk link frame 27 to any available outgoing analog trunk, such as 40, appearing in outgoing trunk link frame 29 in the usual manner. However, if the destination is served by an outgoing time division multiplex line such as line 18, the marker will select an idle one of digital trunks 17–1 through 17–24 and upon finding such a trunk will seize the trunk and outgoing trunk link frame 9. Incident to the establishment of a cross-office connection, however, marker 15 will seize an analog-to-PCM junctor 350 instead of a wire junctor. Once again, marker 15 will seize junctor time slot link 310 and operate link switch 312. This time, however, switch 312 will be operated in the same manner that trunk time slot link switch 215 was operated when trunk 35–1 was selected. That is, the level of switch 312 that will be selected to connect pulses to analog-to-PCM junctor 350 will be the level whose clock pulses correspond to the sequence of pulses appropriate to the time slot corresponding to the selected outgoing trunk. Let it be assumed that trunk 17–1 was idle and was selected by marker 15. The analog signals are entered into encoder 309 under control of gate 352 operated by signals provided by switch 312. The input to gate 352 is provided by gate 351 which is controlled by clock phase pulses provided through gate 314 in similar manner to that in which gate 314 provided clock phase pulses to junctor 305. The digital signals at the output of encoder 309 are delivered to outgoing trunk 17–1 under the joint control of gate 354, which is supplied by signals from switch 312 that are appropriate to the time slot served by trunk 17–1, and gate 355, which is supplied with clock phase pulses from switch 314. Digital signals from the called party arriving over line 18 are received in receiver 20 and passed to trunk 17–1 under control of time slot distributor 304 and lead OTS'–1. The signals enter gate 357 of analog-to-PCM junctor 350, are decoded to analog form by decoder 358 and are gated out to analog trunk 25 through gate 359. Gates 357 and 359 are enabled in step with the time slot served by trunk 17–1 through signals applied to these gates from switch 312.

Accordingly, I have shown a switching office capable of establishing cross-office connections between time division multiplex lines and analog trunks by providing a plurality of digital trunks equal in number to the number of incoming and outgoing time division channels carried by the office and providing the incoming digital trunks with pulses from a time slot switch in correspondence to the time slots of the outgoing channel to which a cross-office connection is established. Further, I permit connections between analog trunks and time division multiplex lines through the use of junctor circuits also provided with appropriate readout pulses from a time slot link switch whose operation is governed by common control in accordance with the time slots of the channel of the TDM line involved in the connection. Encoder 309 has been shown in each of these junctors to simplify the representation of the wiring in the drawing. It should be understood, however, that one encoder may be used for up to 96 different junctors.

It should be apparent that the illustrative embodiment may be adapted for use with register-senders of the type that are equipped to receive multifrequency signaling instead of dial pulsing via the provision of a suitable circuit similar to the PCM-to-analog junctor 305, for converting the pattern of bits representing the called number information into the multifrequency signals that the register-sender normally expects to receive. For economy these converter circuits could be in the junctors of the incoming register link network which are used by the incoming digital trunks to access the register-senders. Likewise a converter circuit, similar to the analog-to-PCM junctor 350 may be provided in register-sender 11 or in the incoming register link 10 for converting the multifrequency outpulsing into a suitable pattern of binary signals for entry into B-shift register 209 over lead CNF. Further and other other modifications will be apparent to those of ordinary skill without departing from the spirit and scope of the invention.

What is claimed is:

1. An arrangement for switching communications channels carried by time division multiplex lines through a space division switching network of a switching office having a common control unit, comprising:
- a trunk circuit for each of said communications channels carried by said time division multiplex lines, each said trunk circuit having an appearance in said switching network,
- means for storing in each said trunk circuit associated with an incoming one of said time division multiplex lines the contents of a respective incoming one of said communications channels,
- a time slot link switch connectable under control of said common control unit to said storing means of each said trunk circuit associated with an incoming one of said time division multiplex lines,
- time slot distributor means for supplying to said link switch a respective sequence of storing means readout pulses corresponding to each channel of an outgoing one of said time division multiplex lines,
- means including said common control unit for selecting and establishing a cross-office connection from said storing means respective to said incoming one of said communications channels to one of said trunk circuits associated with an idle communications channel carried by an outgoing one of said time division multiplex lines, and
- means including said control unit and said time slot link switch for connecting a sequence of said pulses corresponding to said selected idle outgoing communications channel to said storing means of said incoming trunk circuit to read out the contents thereof into said cross-office connection.

2. An arrangement according to claim 1 wherein said common control unit includes a register-sender connectable to any of said trunk circuits associated with an incoming one of said time division multiplex lines and wherein each of said last-mentioned trunk circuits includes second register means and means for inserting into said second register means a signal indicating the connection of said trunk circuit to said register-sender.

3. An arrangement according to claim 2 further comprising gating means connected to said second register means and means for controlling said gating means to transfer the contents of said second register means to an outgoing channel of said incoming time division multiplex line.

4. An arrangement according to claim 2 wherein said storing means of said incoming trunk circuit includes a primary and a secondary shift register, connection path means for transferring a portion of the contents of said primary shift register to said register-sender and connection path means for transferring the contents of said register-sender to said secondary shift register.

5. An arrangement according to claim 2 wherein said storing means of said incoming trunk circuit includes a primary and a secondary shift register, connection path means for transferring a portion of the contents of said primary shift register to said register-sender and connection path means for inserting subsequent to the establishment of said cross-office connection, a signal to indicate the calling condition of said selected one of said trunk circuits associated with said outgoing time division multiplex line.

6. An arrangement according to claim 4 further comprising connection path means for transferring the contents of said register-sender to said secondary shift register.

7. An arrangement for establishing communications connections among channels carried by time division multiplex lines and analog trunks comprising
- a switching office having a space division switching network operated by a common control unit to establish cross-office connections,
- a plurality of analog trunks appearing in said network,
- a digital trunk circuit appearing in said network for each of said communications channels carried by said time division multiplex lines,
- a plurality of junction circuits including conversion junctor circuits having encoder means for translating analog signals into pulse code modulation signals and decoder means for translating pulse code modulation signals into analog signals,
- gating means connected to said decoder and encoder means,
- a time slot link switch connected to said gating means, said link switch being operable to apply to said gating means sequences of pulses corresponding to any channel of one of said digital trunks, and
- means including said common control unit for establishing a cross-office connection between one of said analog and one of said digital trunks including one of said conversion junctor circuits, said common control unit operating said time slot link switch connected to said gating means to govern the admission and release of said analog and digital signals into and out of said decoder and encoder means, respectively, in step with said sequences of pulses corresponding to the channel of said time division multiplex line associated with said digital trunk involved in said cross-office connection.

8. A communication switching system for interconnecting incoming and outgoing time division multiplex lines by space division switching means comprising
- a plurality of incoming and outgoing digital trunk circuits, there being as many digital trunk circuits as the sum of the number of incoming and outgoing multiplexed channels carried by said multiplex lines,
- each of said incoming digital trunk circuits including storage means for receiving the multiplex signals from an associated multiplex line channel, means for selecting an idle outgoing digital trunk circuit and connecting said selected outgoing digital trunk circuit to a calling one of said incoming digital trunk circuits, and means including a time slot link switch having a plurality of horizontal and vertical paths therein, said horizontal paths each being connected to a respective source of time slot signals in synchronism with the time slot signals of a respective one of said outgoing digital trunk circuits and said vertical paths each being connectable to a respective one of said storage means in said incoming digital trunk circuits for applying to said storage means in said calling one of said incoming digital trunk circuits a sequence of readout pulses dependent upon the selected one of said outgoing digital trunk circuits.

* * * * *